US011738352B1

(12) United States Patent
Sims et al.

(10) Patent No.: US 11,738,352 B1
(45) Date of Patent: Aug. 29, 2023

(54) SYSTEMS AND METHOD FOR SORTING PARTICLES SUSPENDED IN A FLUID

(71) Applicant: The United States of America, as represented by the Secretary of the Navy, San Diego, CA (US)

(72) Inventors: Patrick Craig Sims, Ladera Ranch, CA (US); Teresa Emery-Adleman, San Diego, CA (US); Andrew B. Sabater, San Diego, CA (US); Robert D. George, Chula Vista, CA (US); Kara C. Sorensen, San Diego, CA (US); Anna Obraztsova, San Diego, CA (US); Pamela A. Boss, San Diego, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 17/741,625

(22) Filed: May 11, 2022

(51) Int. Cl.
   *B03B 5/48* (2006.01)
   *B01L 3/00* (2006.01)
   *B03B 9/00* (2006.01)

(52) U.S. Cl.
   CPC .......... *B03B 5/48* (2013.01); *B01L 3/502753* (2013.01); *B03B 9/00* (2013.01)

(58) Field of Classification Search
   CPC ......... B03B 5/48; B03B 9/00; B01L 3/50273; B01L 3/502761; B01L 2200/0652; B01L 2300/0681; B01L 2400/086; B01L 3/502753; G01N 2015/1081; G01N 1/4077; G01N 2001/4088; G01N 2015/0288; B01D 43/00

USPC .................................................. 209/235, 273
See application file for complete search history.

(56) References Cited

U.S. PATENT DOCUMENTS

| 7,735,652 | B2 * | 6/2010 | Inglis ............... | B01L 3/502753 210/433.1 |
| 2016/0146778 | A1 * | 5/2016 | Astier ............... | B01L 3/502761 506/12 |
| 2021/0001337 | A1 * | 1/2021 | Shkolnikov ........ | G01N 15/1484 |
| 2021/0033517 | A1 * | 2/2021 | Knoll ..................... | B01D 43/00 |

(Continued)

FOREIGN PATENT DOCUMENTS

WO    WO-2019211523 A1 * 11/2019 ............. B01D 43/00

*Primary Examiner* — Gene O Crawford
*Assistant Examiner* — Muhammad Awais
(74) *Attorney, Agent, or Firm* — Naval Information Warfare Center Pacific; Kyle Eppele; James R. McGee (57) ABSTRACT

A system and method sorts particles suspended in a fluid. The system includes a transverse flow filter and a microfluidic sorter. The transverse flow filter concentrates the particles in a retained portion of the fluid. The microfluidic sorter sorts the particles and includes a delivery channel and at least one sorting stage. The delivery channel is dimensioned to permit passage of all the particles in the retained fluid from the transverse flow filter. The delivery channel delivers the particles in the retained fluid to a respective input for each sorting stage and exhausts a remainder of both the particles and the retained fluid at a drain output. Each sorting stage has a labyrinth of interconnected passageways dimensioned to permit passage from the respective input to a respective output for the sorting stage of those of the particles smaller than a respective size for the sorting stage.

20 Claims, 4 Drawing Sheets

(56) References Cited

U.S. PATENT DOCUMENTS

| | | | |
|---|---|---|---|
| 2021/0121883 A1* | 4/2021 | Shkolnikov | B01L 3/502761 |
| 2021/0220827 A1* | 7/2021 | Spero | B01L 3/502753 |
| 2021/0283611 A1* | 9/2021 | Kim | B01L 3/502776 |

* cited by examiner

SYSTEMS AND METHOD FOR SORTING PARTICLES SUSPENDED IN A FLUID

FEDERALLY-SPONSORED RESEARCH AND DEVELOPMENT

The United States Government has ownership rights in this invention. Licensing and technical inquiries may be directed to the Office of Research and Technical Applications, Naval Information Warfare Center Pacific, Code 72120, San Diego, Calif., 92152; voice (619) 553-5118; ssc_pac_t2@navy.mil. Reference Navy Case Number 110807.

BACKGROUND OF THE INVENTION

The sensing of microbial organisms requires delivery of the microbial organisms or their related markers to an interaction region where the sensing modality may interact with the microbial organisms or their markers. Additionally, the microbial organisms or their markers should be present at suitable concentrations above the limit of the sensing modality, and the interaction region should be free of factors that interfere with sensing performance. Existing microfluidic devices sort particles by size; however, these devices are easily clogged and rendered inoperable when analyzing certain samples of microbial organisms, such as marine samples including seawater. Existing devices for particle concentration include centrifuges and adsorption-elution systems. Centrifuges are not portable and are not scalable to large quantities of liquid. Adsorption-elution systems require multiple elution steps and tailored chemicals to remove the adsorbed particles of interest.

SUMMARY

A system sorts particles suspended in a fluid. The system includes a transverse flow filter and a microfluidic sorter. The transverse flow filter concentrates the particles in a retained portion of the fluid. The microfluidic sorter sorts the particles and includes a delivery channel and at least one sorting stage. The delivery channel is dimensioned to permit passage of all the particles in the retained fluid from the transverse flow filter. The delivery channel delivers the particles in the retained fluid to a respective input for each sorting stage and exhausts a remainder of both the particles and the retained fluid at a drain output. Each sorting stage has a labyrinth of interconnected passageways dimensioned to permit passage from the respective input to a respective output for the sorting stage of those of the particles smaller than a respective size for the sorting stage.

A method sorts particles suspended in fluid. The particles are concentrated in a retained portion of the fluid with a transverse flow filter. The particles in the retained fluid are delivered to a respective input for each of at least one sorting stage of a microfluidic sorter via a delivery channel of the microfluidic sorter. The delivery channel is dimensioned to permit passage of all the particles in the retained fluid from the transverse flow filter. The particles in the retained fluid are sorted with the sorting stage or stages. Each sorting stage has a labyrinth of interconnected passageways dimensioned to permit passage from the respective input to a respective output for the sorting stage of those of the particles smaller than a respective size for the sorting stage. A remainder of both the particles and the retained fluid is exhausted at a drain output.

BRIEF DESCRIPTION OF THE DRAWINGS

Throughout the several views, like elements are referenced using like references. The elements in the figures are not drawn to scale and some dimensions are exaggerated for clarity.

DETAILED DESCRIPTION OF EMBODIMENTS

The disclosed systems and method below may be described generally, as well as in terms of specific examples and/or specific embodiments. For instances where references are made to detailed examples and/or embodiments, it should be appreciated that any of the underlying principles described are not to be limited to a single embodiment, but may be expanded for use with any of the other methods and systems described herein as will be understood by one of ordinary skill in the art unless otherwise stated specifically.

Embodiments of the invention combine a tangential flow filter and a microfluidic sorter to filter out particles above a characteristic size, concentrate particles above and below predetermined sizes, and sort these concentrated particles according to size. The concentrated and sorted particles are delivered to a specified region where they are interrogated, collected, or flowed into the inlet of a downstream system. The combination of tangential flow filtration and microfluidic sorting is a scaleable method of concentrating and sorting microbial organisms suspended in a fluid, such as water. The disclosed embodiments are scaleable to handle large volumes of fluid with a minimal need for chemicals or other consumables. No existing system concentrates and sorts microbial organisms.

Figure 1:
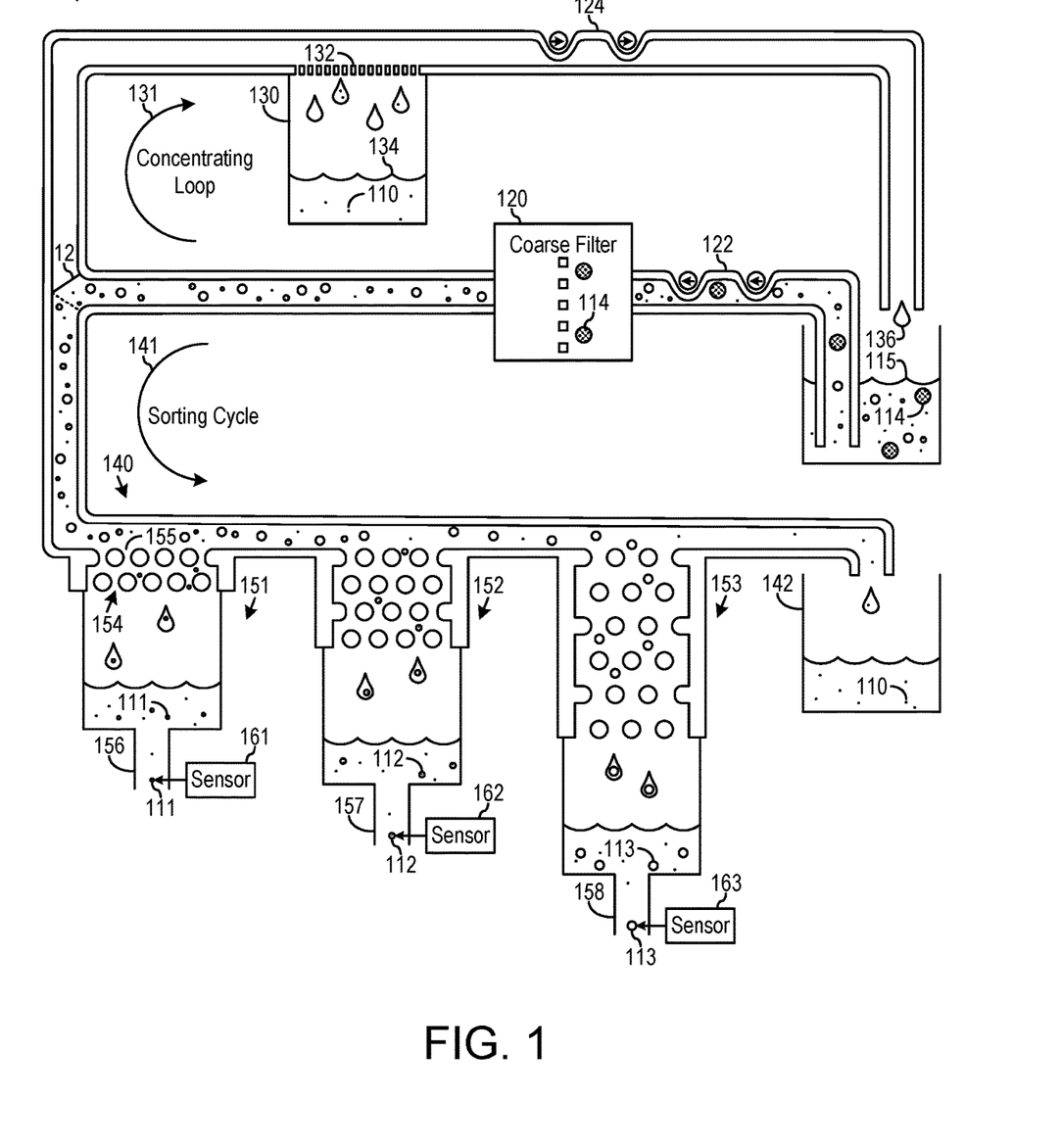
FIG. 1 is a block diagram of a system for sorting and interrogating particles suspended in a fluid in accordance with an embodiment of the invention.

FIG. 1 is a block diagram of a system 100 for sorting and interrogating particles 111, 112, and 113 suspended in a fluid 115 in accordance with an embodiment of the invention. Particles have increasing sizes from fine particles 110, small particles 111, medium particles 112, large particles 113, to coarse particles 114. Note the descriptive terms for particle sizes are relative descriptive terms. The system 100 includes an optional filter 120, a transverse flow filter 130, and a microfluidic sorter 140.

The optional filter 120 blocks any coarse particles 114 in the fluid 115 that are too large for the microfluidic sorter 140. Thus, coarse particles 114 do not reach the transverse flow filter 130 or the microfluidic sorter 140. In one embodiment, the filter 120 is a conventional dead-end filter and small amounts of an added surfactant, such as polysorbate-20, reduce adhesion of particles to each other and to the components of the system 100. In an embodiment, a pump 122, such as a peristaltic, syringe, perfusion, or differential pressure pump, pumps the fluid 115 with the particles 110, 111, 112, 113, and 114 toward the filter 120, and pumps the fluid 115 with the particles 110, 111, 112, and 113, but not particles 114, through the filter 120.

The transverse flow filter 130 concentrates the particles 111, 112, and 113 in a retained portion of the fluid 115. The transverse flow filter 130 includes a transfer channel 132 having a surrounding wall with a plurality of pores dimensioned to permit passage of the fluid 115 but not the particles 111, 112, and 113. The permeate 134 includes a portion of the fluid 115 passing through the pores. The retentate 136 includes the particles 111, 112, and 113 and a remainder of the fluid 115 passing through the transfer channel 132. Because the permeate 134 passes through the pores of the transfer channel 132, but the particles 111, 112, and 113 do not, the retentate 136 concentrates the particles 111, 112, and 113 in the remainder of the fluid 115.

However, any fine particles 110 pass freely through the pores of the transfer channel 132, and consequently the transverse flow filter 130 does not appreciably change the concentration of any fine particles 110 in the retentate 136.

In one embodiment, an optional second pump 124, such as a peristaltic pump, pumps at a slower rate than the pump 122, and a difference in flow rates between pumps 122 and 124 determines a flow rate of the permeate 134 through the transverse flow filter 130.

A valve 12 switches a flow between a concentrating loop 131 and a sorting cycle 141. FIG. 1 shows the valve 12 switched to the sorting cycle 141. In one embodiment, when the valve 12 is switched to the concentrating loop 131, the retentate 136 is repeatedly recycled through the transverse flow filter 130 until a quantity of the retained portion of the original fluid 115 reduces to a predetermined quantity. Upon the retained portion of the fluid 115 becoming reduced to the predetermined quantity, the valve 12 switches the flow of the particles 110, 111, 112, and 113 and the retained fluid 115 away from the transverse flow filter 130 for concentrating the particles 111, 112, and 113 during the concentrating loop 131 and towards the microfluidic sorter 140 for sorting the particles 111, 112, and 113 during the sorting cycle 141.

The microfluidic includes one or more sorting stages 151, 152, and 153. Each of the sorting stages 151, 152, and 153 have a labyrinth of interconnected passageways dimensioned to permit passage of those of the particles 111, 112, and 113 smaller than a respective size for the sorting stage. Sorting stage 151 has its labyrinth 154 dimensioned to permit passage of small particles 111 from a respective input 155 to a respective output 156 for the sorting stage 151. Similarly, sorting stage 152 has its labyrinth dimensioned to permit passage of medium particles 112, and sorting stage 153 has its labyrinth dimensioned to permit passage of large particles 113. Again, the descriptive terms for particle sizes are relative descriptive terms.

Because the flow passes sorting stages 151, 152, and 153 in this order, few of the small particles 111 sorted by sorting stage 151 reach sorting stage 152, and few of the medium particles 112 sorted by sorting stage 152 reach sorting stage 153. Thus, sorting stage 151 sorts small particles 111, sorting stage 152 sorts medium particles 112, and sorting stage 153 sorts large particles 113. In addition, the transverse flow filter 130 has pores in the transfer channel 132 dimensioned smaller than the respective size for each of the sorting stages 151, 152, and 153 to permit passage of the fluid 115, but not the particles 111, 112, and 113 sorted in sorting stages 151, 152, and 153.

The system 100 additionally interrogates the particles 111, 112, and 113. The system 100 further includes respective sensors 161, 162, and 163 for the sorting stages 151, 152, and 153. The sensor 161 interrogates the small particles 111 at the respective output 156 for the sorting stage 151. Similarly, sensor 162 interrogates the medium particles 112, and sensor 163 interrogates the large particles 113. Example interrogation includes counting each of the small particles 111, medium particles 112, and large particles 113. A remainder of both the fine particles 110 and the retained fluid 115 is exhausted at a drain output 142.

Note that fine particles 110 are not appreciably sorted in sorting stages 151, 152, and 153; however, fine particles 110 typically do not affect interrogating the particles 111, 112, and 113 of interest. When fine particles 110 do adversely affect interrogating the particles 111, 112, and 113, another preliminary sorting stage sorts out those of fine particles 110 with a size sufficient to adversely affect interrogating the particles 111, 112, and 113 of interest. Such a preliminary sorting stage need not include an interrogating sensor.

In one embodiment, the fluid 115 is seawater, and the small particles 111, medium particles 112, and large particles 113 include microbial organisms suspended in the seawater. The respective output 156 for sorting stage 151 has a diameter matching a spot size of a laser, and the respective sensor 161 for sorting stage includes the laser interrogating the microbial organisms across the spot size of the respective output 156 for sorting stage 151. Sorting stages 152 and 153 are similarly configured. The sorting stages 151, 152, and 153 are arranged in a sequence from an initial sorting stage 151 to a last sorting stage 153. The respective sizes of the sorting stages monotonically increase from the initial sorting stage 151 to the last sorting stage 153. Thus, the respective size for small particles 111 of the initial sorting stage 151 is smaller than the respective size for large particles 113 of the last sorting stage 153. The laser of the sensor 161 for the initial sorting stage 151 interrogates the microbial organisms smaller than the respective size for the initial sorting stage 151 and the laser of the sensor 163 for the last sorting stage 153 interrogates the microbial organisms smaller than the respective size for the last sorting stage 153.

It will be appreciated that sensors 161, 162, and 163 are optical, electrical, or electrochemical sensors in various embodiments of the invention. For example, a substrate of the system 100 is patterned with metal or carbon interrogation electrodes or functionalized with one or more moieties that bind to particles of interest. Furthermore, the particles delivered to outputs 156, 157, and 158 of sorting stages 151, 152, and 153 are collected or are supplied to downstream microfluidic systems in various embodiments of the invention. For example, an initial sorting system sorts the particles into broad size ranges, and a further sorting system for each broad size range further sorts into narrower ranges. In another example, the drain output 142 is recycled to system 100 or to another similar system for recovering any potentially sorted particles that instead traveled to the drain output 142.

For clarity of the direction of various flows, FIG. 1 shows droplets for certain flows, such as the droplet for retentate 136. However, typically air is substantially excluded from inside the system 100 for sorting and interrogating particles 111, 112, and 113 suspended in a fluid 115.

Figure 2:
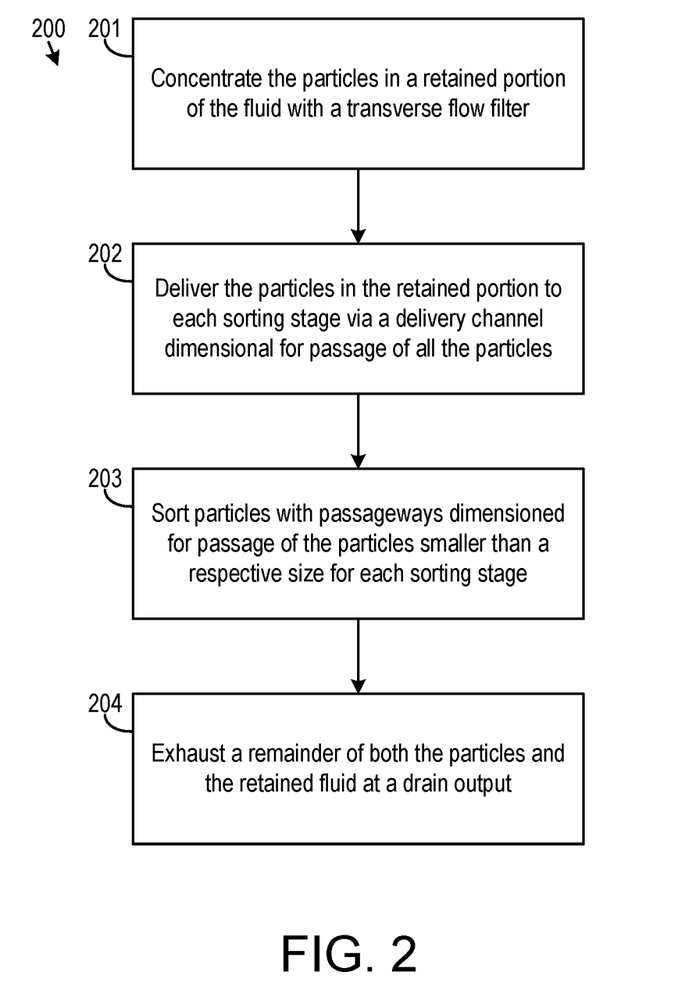
FIG. 2 is a flow diagram of a process for sorting particles suspended in a fluid in accordance with an embodiment of the invention.

FIG. 2 is a flow diagram of a process 200 for sorting particles suspended in a fluid in accordance with an embodiment of the invention.

At step 201, the particles are concentrated in a retained portion of the fluid with a transverse flow filter. At step 202, the particles are delivered in the retained fluid to a respective input for each of at least one sorting stage of a microfluidic sorter. The particles are delivered via a delivery channel of the microfluidic sorter. The delivery channel is dimensioned to permit passage of all the particles in the retained fluid received from the transverse flow filter. At step 203, the particles are sorted in the retained fluid with at least one sorting stage, which each have a labyrinth of interconnected passageways dimensioned to permit passage from the respective input to a respective output for the sorting stage of those of the particles smaller than a respective size for the sorting stage. At step 204, a remainder of both the particles and the retained fluid is exhausted at a drain output.

Figure 3A:
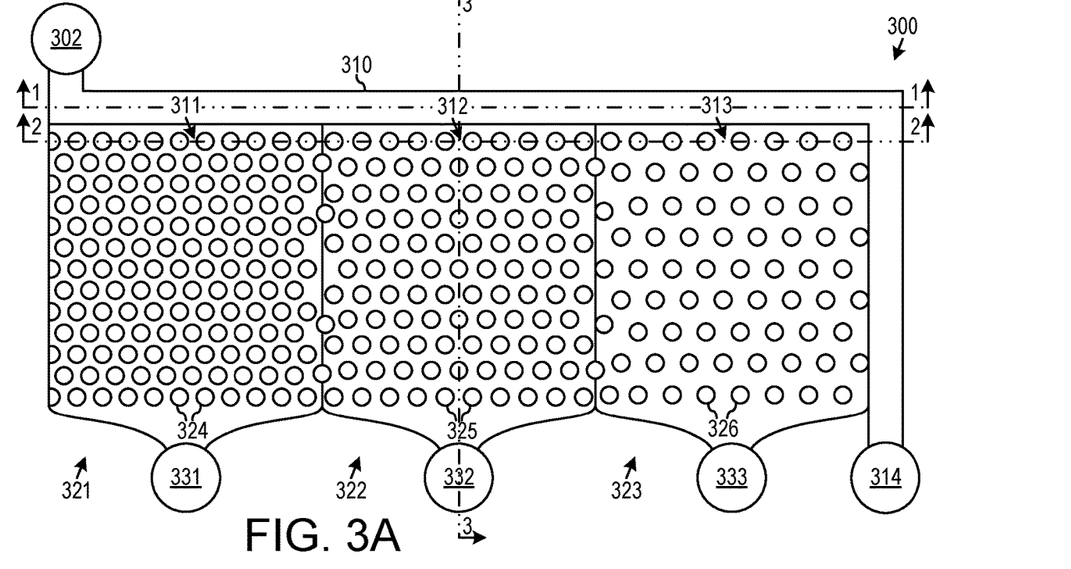
FIG. 3A is a plan view and FIG. 3B-D are cross-sections of a microfluidic sorter of a system for sorting particles suspended in a fluid in accordance with an embodiment of the invention.
Figure 3B:
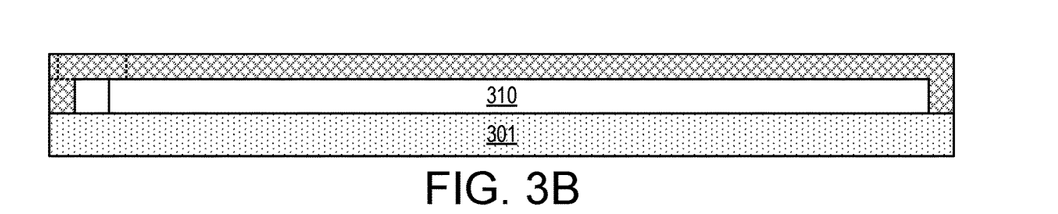
Figure 3C:
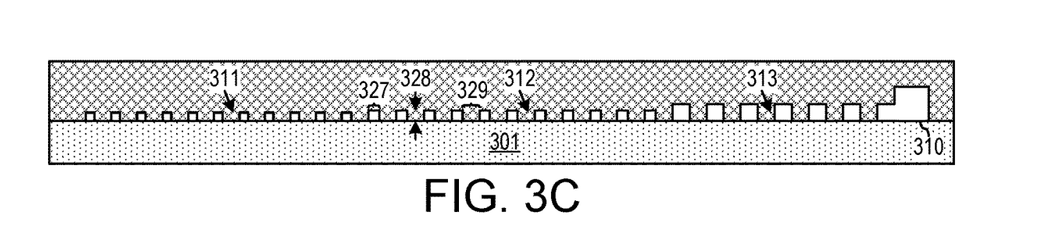
Figure 3D:
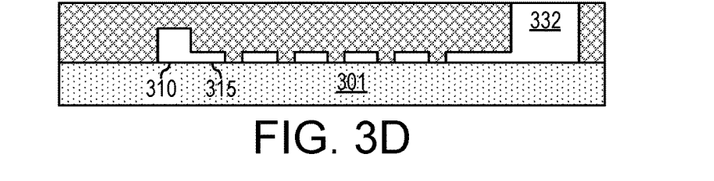

FIG. 3A is a plan view and FIG. 3B-D are cross-sections of a microfluidic sorter 300 of a system for sorting particles suspended in a fluid in accordance with an embodiment of the invention. FIG. 3B is a cross-section along section 1-1 of FIG. 3A, FIG. 3C is a cross-section along section 2-2 of FIG. 3A, and FIG. 3D is a cross-section along section 3-3 of FIG. 3A.

A delivery channel 310 of the microfluidic sorter 300 is dimensioned to permit passage of all the particles in the retained fluid from the transverse flow filter. An optional dead-end filter blocks any additional particles in the fluid that are too large for passage through the delivery channel 310 of the microfluidic sorter 300. An input 302 delivers the particles in the retained fluid from the transverse flow filter to the delivery channel 310. The delivery channel 310 delivers the particles in the retained fluid to a respective input 311, 312, and 313 for each of at least one sorting stage 321, 322, and 323, and exhausts a remainder of both the particles and the retained fluid at a drain output 314. A pump, such as a syringe pump, pumps the retained fluid with the particles through the delivery channel 310 and each sorting stage 321, 322, and 323 to a respective output 331, 332, and 333 for each sorting stage 321, 322, and 323. Each sorting stage 321, 322, or 323 has a funnel region between their pillars 324, 325, and 326 and their respective outputs 331, 332, and 333.

The delivery channel 310 of the microfluidic sorter 300 sorter delivers the particles in the retained fluid to the sorting stages 321, 322, and 323 in an order corresponding to a sequence beginning with the initial sorting stage 321 and ending with the last sorting stage 323. Thus, the respective input 312 for sorting stage 322 receives a diminished concentration of the particles smaller than the respective size for the initial sorting stage 321. Similarly, the respective input 313 for last sorting stage 323 receives a diminished concentration of the particles smaller than the respective size for each of the preceding sorting stages 321 and 322 in the sequence. The delivery channel 310 delivers to the respective input 313 for the last sorting stage 323 before the delivery channel 310 exhausts a remainder at the drain output 314.

In one embodiment, the microfluidic sorter 300 includes pillars 324, 325, and 326 in each of the sorting stages 321, 322, or 323. A space between the pillars 324 provides a labyrinth of interconnected passageways dimensioned to permit passage of those particles smaller than the respective size for the sorting stage 321. Similarly, a space between the pillars 325 is dimensioned to permit passage of those particles smaller than the respective size for the sorting stage 322, and a space between the pillars 326 is dimensioned to permit passage of those particles smaller than the respective size for the sorting stage 323. In one embodiment, the pillars 324, 325, and 326 of each sorting stage 321, 322, or 323 are arranged in a hexagonal grid with a width of nearest approach between each adjacent pair of the pillars of each sorting stage matching the respective size for the sorting stage and a height of the pillars of each sorting stage also matching the respective size for the sorting stage. For example with reference to FIG. 3C, a width 327 of nearest approach between pillars of sorting stage 322 matches the respective size for the sorting stage 322 and a height 328 of the pillars of sorting stage 322 also matches the respective size for the sorting stage 322.

In FIG. 3A-D, the width 327 and the pillar width 329 are shown with a same order of magnitude for clarity of presentation. In another embodiment, the width 327 of nearest approach between each adjacent pair of the pillars 325 of sorting stage 322 is at least an order of magnitude larger than a width 329 of the pillars 325 of the sorting stage 322. If FIG. 3A-D was drawn to scale, pillars 324, 325, and 326 would be reduced to pinpoints for this embodiment. Having spacing width 327 at least an order of magnitude larger than pillar width 329 increases the area efficiency of the sorting stages 321, 322, and 323 in the plan view of FIG. 3A because most of the area is devoted to the labyrinth of interconnected passageways between the pillars 324, 325, and 326. Furthermore, having spacing width 327 at least an order of magnitude larger than pillar width 329 reduces and equalizes the flow resistance through the sorting stages 321, 322, and 323.

In one embodiment, the microfluidic sorter 300 includes a gap adjacent the delivery channel 310. For example in FIG. 3D, sorting stage 322 has the gap 315 between the delivery channel 310 and the sorting stage 322. The gap 315 has a height matching or slightly exceeding the height 328 of the pillars of sorting stage 322 and also matching the respective size for sorting stage 322. Similarly, sorting stages 321 and 323 have the gap of different heights matching the respective size for these sorting stages 321 and 323. The gap 315 initiates sorting along one dimension. For a plate shaped particle, the thin dimension of the plate shaped particle may fit into the gap 315, but the plate shaped particle slides along the gap 315 until reaching, for example, sorting stage 323 that accommodates the other dimensions of the plate shaped particle. A rod shaped particle may similarly fit into the gap 315 to initiate sorting, and might temporarily clog the input 312 for sorting stage 322 until shook free due to fluid turbulence. Conversely, a particle with no dimensions fitting into the gap 315 remains in the delivery channel 310 until reaching the larger gap of a subsequent sorting stage or until ultimately reaching the drain output 314.

Thus, the initial sorting stage 321 has the width of nearest approach between each adjacent pair of the pillars 324 of the initial sorting stage 321 matching the respective size for the initial sorting stage 321, the height of the pillars 324 of the initial sorting stage 321 matching the respective size for the initial sorting stage 321, and the gap between the delivery channel 310 and the initial sorting stage 321 matching the respective size for the initial sorting stage 321. The last sorting stage 323 has the width of nearest approach between adjacent pillars 326 matching the respective size for the last sorting stage 323, the height of the pillars 326 matching the respective size for the last sorting stage 323, and the gap between the delivery channel 310 and the last sorting stage 323 matching the respective size for the last sorting stage 323.

In one embodiment, the microfluidic sorter 300 includes a substrate 301 having a major surface providing an interior surface of the delivery channel 310 and the labyrinth of interconnected passageways of one or more sorting stages 321, 322, and 323. The pillars 324, 325, and 326 of each sorting stage 321, 322, or 323 are molded from polydimethylsiloxane (PDMS) with a cap of each of the pillars 324, 325, and 326 in contact with the major surface of the substrate 301. The substrate 301 is quartz in this embodiment to enable microscopic inspection of the microfluidic sorter 300 during operation. It will be appreciated that pillars and substrate are each made of PMDS, quartz, glass, or silicon in various embodiments.

Figure 4:
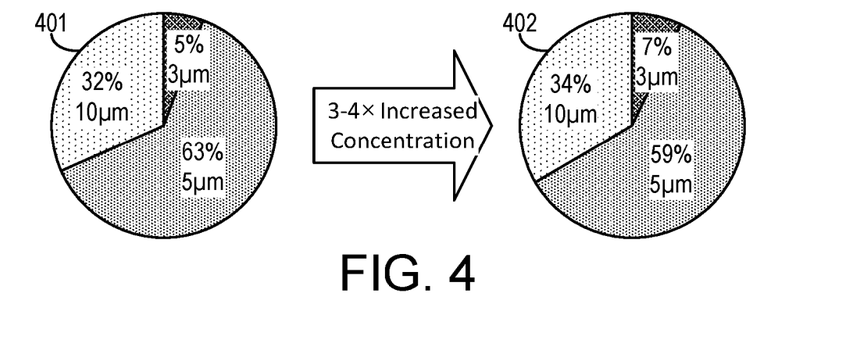
FIG. 4 is pie charts showing experimental results for a transverse flow filter of a system for sorting particles suspended in a fluid in accordance with an embodiment of the invention.

FIG. 4 is pie charts 401 and 402 showing experimental results for a transverse flow filter of a system for sorting particles suspended in a fluid in accordance with an embodiment of the invention. In the implemented system for sorting particles, a peristaltic pump pumps the feed stock through an initial dead-end filter that removes particles with a size greater than 40 µm, and then through the transverse flow filter with pores dimensioned to pass fluid and particles smaller than about 3 µm. Thus, particles between 3 µm and 40 µm become concentrated in a retained portion of the fluid. This concentration loop is repeated until particles become concentrated by a factor of 3-4 times. The retained particles of 3, 5, and 10 µm have essentially the same relative concentration before and after the transverse flow filter as shown in the experimental results of the before pie chart 401 and the after pie chart 402 of FIG. 4.

Figure 5:
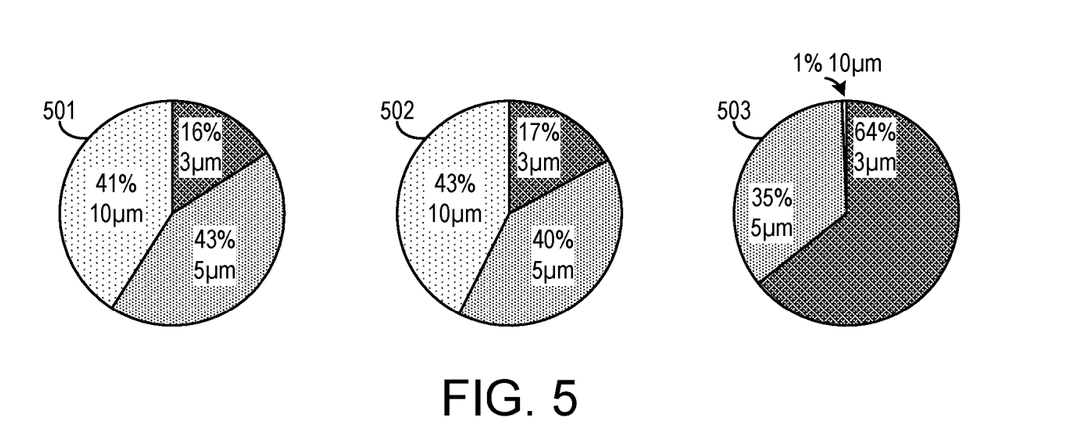
FIG. 5 is pie charts showing experimental results for a microfluidic sorter of a system for sorting particles suspended in a fluid in accordance with an embodiment of the invention.

FIG. 5 is pie charts 501, 502, and 503 showing experimental results for a microfluidic sorter of a system for sorting particles suspended in a fluid in accordance with an embodiment of the invention. The implemented system includes a syringe filled with the retentate from the transverse flow filter. Manual pressure delivers the particles and fluid in the syringe to an input of the microfluidic sorter, which has a single sorting stage. The delivery channel of the microfluidic sorter passes particles with a size below 40 µm from input to drain output, matching the upper limit on particle size enforced by the initial dead-end filter. The particles and fluid from the syringe either traverse through the pillars of the single sorting stage to the sorting output, or bypass the single sorting stage and exhaust at the drain output. FIG. 5 shows the experimental results of the relative concentrations of particles of 3, 5, and 10 µm at the input of the microfluidic sorter in pie chart 501, at the exhaust of the drain output in pie chart 502, and at the sorting output of the single sorting stage in pie chart 503. As shown in pie chart 503, particles of 10 µm size are essentially blocked from reaching the sorting output.

From the above description of a Systems and Method for Sorting Particles Suspended in a Fluid, it is manifest that various techniques may be used for implementing the concepts of system 100 with microfluidic sorter 300 and method 200 without departing from the scope of the claims. The described embodiments are to be considered in all respects as illustrative and not restrictive. The systems and method disclosed herein may be practiced in the absence of any element that is not specifically claimed and/or disclosed herein. It should also be understood that each of system 100 or method 200 is not limited to the particular embodiments described herein, but is capable of many embodiments without departing from the scope of the claims.

We claim:

1. A system for sorting a plurality of particles suspended in a fluid, comprising:
 a transverse flow filter for concentrating the particles in a retained portion of the fluid; and
 a microfluidic sorter for sorting the particles, the microfluidic sorter including:
  a delivery channel dimensioned to permit passage of all the particles in the retained fluid from the transverse flow filter, the delivery channel delivering the particles in the retained fluid to a respective input for each of at least one sorting stage and exhausting a remainder of both the particles and the retained fluid at a drain output; and
  the at least one sorting stage, which each have a labyrinth of interconnected passageways dimensioned to permit passage from the respective input to a respective output for the sorting stage of those of the particles smaller than a respective size for the sorting stage.

2. The system of claim 1, wherein the transverse flow filter includes a transfer channel having a surrounding wall with a plurality of pores dimensioned to permit passage of the fluid and not the particles, a retentate including the particles and that of the fluid passing through the transfer channel and a permeate including that of the fluid passing through the pores, the retentate concentrating the particles in the retained portion of the fluid.

3. The system of claim 2, wherein the retentate is repeatedly recycled through the transverse flow filter during a concentrating loop until a quantity of the retained portion of the fluid reduces to a predetermined quantity.

4. The system of claim 3, further comprising a valve that, upon the retained portion of the fluid becoming reduced to the predetermined quantity, switches a flow of the particles and the retained fluid away from the transverse flow filter for concentrating the particles during the concentrating loop and towards the microfluidic sorter for sorting the particles during a sorting cycle.

5. The system of claim 1 for sorting and additionally interrogating the particles, the system further comprising a respective sensor for each of the at least one sorting stage, the respective sensor for interrogating those of the particles at the respective output for the sorting stage.

6. The system of claim 5, wherein:
 the fluid is seawater;
 the particles include microbial organisms suspended in the seawater;
 the respective output for each sorting stage has a diameter matching a spot size of a laser; and
 the respective sensor for each sorting stage includes the laser interrogating the microbial organisms across the spot size of the respective output for the sorting stage.

7. The system of claim 6, wherein the at least one sorting stage is a plurality of sorting stages in a sequence from an initial sorting stage to a last sorting stage, and the laser for the initial sorting stage interrogates the microbial organisms smaller than the respective size for the initial sorting stage and a laser for the last sorting stage interrogates the microbial organisms smaller than the respective size for the last sorting stage, with the respective size for the initial sorting stage smaller than the respective size for the last sorting stage.

8. The system of claim 1, wherein the at least one sorting stage is a plurality of sorting stages in a sequence from an initial sorting stage to a last sorting stage, with the respective size for each the sorting stages monotonically increasing from the initial sorting stage to the last sorting stage, such that the respective size for the initial sorting stage is smaller than the respective size for the last sorting stage.

9. The system of claim 8, wherein:
 the delivery channel of the microfluidic sorter delivers the particles in the retained fluid to the sorting stages in an order corresponding to the sequence beginning with the initial sorting stage and ending with the last sorting stage, such that the respective input for each of the sorting stages receives a diminished concentration of the particles smaller than the respective size for any preceding one or ones of the sorting stages in the sequence; and the delivery channel of the microfluidic sorter delivers to the respective input for the last sorting stage before the delivery channel of the microfluidic sorter exhausts the remainder at the drain output.

10. The system of claim 9, wherein the transverse flow filter includes a transfer channel having a surrounding wall with a plurality of pores dimensioned smaller than the respective size for each of the sorting stages to permit passage of the fluid and not the particles, a retentate including the particles and that of the fluid passing through the transfer channel and a permeate including that of the fluid passing through the pores, the retentate concentrating the particles in the retained portion of the fluid.

11. The system of claim 1, further comprising a pump for pumping the retained fluid with the particles through the delivery channel of the microfluidic sorter to the respective output for each of the at least one sorting stage and to the drain output, the pump selected from a group consisting of a peristaltic pump and a syringe.

12. The system of claim 1, further comprising a dead-end filter for blocking any additional particles in the fluid that are too large for passage through the delivery channel of the microfluidic sorter.

13. The system of claim 1, wherein the microfluidic sorter includes a plurality of pillars in each of the at least one sorting stage, a space between the pillars providing the labyrinth of interconnected passageways dimensioned to permit passage of those of the particles smaller than the respective size for the sorting stage.

14. The system of claim 13, wherein the pillars of each sorting stage are arranged in a hexagonal grid with a width of nearest approach between each adjacent pair of the pillars of each sorting stage matching the respective size for the sorting stage and a height of the pillars of each sorting stage also matching the respective size for the sorting stage.

15. The system of claim 14, wherein the width of nearest approach between each adjacent pair of the pillars of each sorting stage is at least an order of magnitude larger than a width of the pillars of the sorting stage.

16. The system of claim 14, wherein the microfluidic sorter includes a gap between the delivery channel and the at least one sorting stage, the gap also having a height matching the respective size for each sorting stage.

17. The system of claim 14, wherein the microfluidic sorter includes a substrate having a major surface providing an interior surface of the delivery channel and the labyrinth of interconnected passageways of the at least one sorting stage, the pillars of each sorting stage molded from polydimethylsiloxane (PDMS) with a cap of each of the pillars of each sorting stage in contact with the major surface of the substrate.

18. The system of claim 17, wherein:
the at least one sorting stage is a plurality of sorting stages in a sequence from an initial sorting stage to a last sorting stage, with the respective size for each the sorting stages monotonically increasing from the initial sorting stage to the last sorting stage, such that the respective size for the initial sorting stage is smaller than the respective size for the last sorting stage;
the initial sorting stage has the width of nearest approach between each adjacent pair of the pillars of the initial sorting stage, the height of the pillars of the initial sorting stage, and a gap between the delivery channel and the initial sorting stage each matching the respective size for the initial sorting stage; and
the last sorting stage has the width of nearest approach between each adjacent pair of the pillars of the last sorting stage, the height of the pillars of the last sorting stage, and a gap between the delivery channel and the last sorting stage each matching the respective size for the last sorting stage.

19. The system of claim 18, wherein the transverse flow filter includes a transfer channel having a surrounding wall with a plurality of pores dimensioned smaller than both the respective size for the initial sorting stage and the respective size for the last sorting stage.

20. A method for sorting a plurality of particles suspended in fluid, comprising:
concentrating the particles in a retained portion of the fluid with a transverse flow filter;
delivering the particles in the retained fluid to a respective input for each of at least one sorting stage of a microfluidic sorter via a delivery channel of the microfluidic sorter, the delivery channel dimensioned to permit passage of all the particles in the retained fluid from the transverse flow filter;
sorting the particles in the retained fluid with the at least one sorting stage, which each have a labyrinth of interconnected passageways dimensioned to permit passage from the respective input to a respective output for the sorting stage of those of the particles smaller than a respective size for the sorting stage; and
exhausting a remainder of both the particles and the retained fluid at a drain output.

* * * * *